United States Patent
Lee

(10) Patent No.: US 10,293,815 B2
(45) Date of Patent: May 21, 2019

(54) DRIVER ASSISTANCE SYSTEM HAVING CONTROLLER AND CONTROLLING METHOD THEREOF

(71) Applicant: Mando Corporation, Pyeongtaek-si, Gyeonggi-do (KR)

(72) Inventor: Sang Hyun Lee, Seongnam-si (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 62 days.

(21) Appl. No.: 15/825,257

(22) Filed: Nov. 29, 2017

(65) Prior Publication Data

US 2018/0148045 A1 May 31, 2018

(30) Foreign Application Priority Data

Nov. 30, 2016 (KR) .......................... 10-2016-0161292

(51) Int. Cl.
| | |
|---|---|
| *B60R 16/023* | (2006.01) |
| *B60W 30/00* | (2006.01) |
| *B60W 40/02* | (2006.01) |
| *B60W 40/10* | (2012.01) |
| *G07C 5/08* | (2006.01) |
| *B60W 50/00* | (2006.01) |
| *G07C 9/00* | (2006.01) |

(52) U.S. Cl.
CPC ............ *B60W 30/00* (2013.01); *B60W 40/02* (2013.01); *B60W 40/10* (2013.01); *B60W 50/00* (2013.01); *G07C 5/0808* (2013.01); *B60W 2050/0001* (2013.01); *B60W 2050/005* (2013.01); *B60W 2050/0043* (2013.01); *B60W 2050/0052* (2013.01)

(58) Field of Classification Search
CPC ..................... B60R 16/023; G07C 9/00; G07C 2009/00507; G07C 2209/63; H04W 4/046
USPC ......................................................... 701/2, 1
See application file for complete search history.

(56) References Cited

U.S. PATENT DOCUMENTS

| | | | | | |
|---|---|---|---|---|---|
| 5,475,654 | A | * | 12/1995 | Furumura ................. | G06F 1/06 368/10 |
| 5,939,998 | A | * | 8/1999 | Caporuscio ............... | G06F 1/32 307/116 |
| 9,043,031 | B1 | * | 5/2015 | Gardner ............... | G05D 1/0016 463/40 |
| 2015/0204671 | A1 | * | 7/2015 | Showering .............. | G01S 19/13 701/469 |

* cited by examiner

Primary Examiner — Tan Q Nguyen
(74) Attorney, Agent, or Firm — Hauptman Ham, LLP

(57) ABSTRACT

The present disclosure relates to a driver assistance system having a controller and a method of controlling the driver assistance system. The driver assistance system may include: at least one sensor; a driving device configured to be controlled on the basis of a sensing result by the sensor; and a controller configured to control the driving device by providing a control signal generated on the basis of information from the sensor, and to determine a point to read information from the sensor in response to an event signal based on a predetermined condition provided from the sensor. Accordingly, it is possible to quickly obtain information with small load, thereby effectively controlling the system.

16 Claims, 3 Drawing Sheets

DRIVER ASSISTANCE SYSTEM HAVING CONTROLLER AND CONTROLLING METHOD THEREOF

CROSS REFERENCE TO RELATED APPLICATION

This application claims priority from Korean Patent Application No. 10-2016-0161292, filed on Nov. 30, 2016, which is hereby incorporated by reference for all purposes as if fully set forth herein.

BACKGROUND OF THE INVENTION

1. Field of the Invention

The present disclosure relates to a driver assistance system having a controller and a controlling method thereof and, more particularly, to a driver assistance system having a controller that can effectively control the driver assistance system by quickly obtaining information with small load, and a method of controlling the driver assistance system.

2. Description of the Prior Art

In general, vehicles are equipped with a driver assistance system (DAS) that warns a driver of a danger to protect the driver and passengers, and automatically controls driving of a vehicle.

As such a driver assistance system, there are a forward collision warning (FCW) system that senses a forward vehicle running in the same direction in the current lane and gives a warning to avoid a collision with the forward vehicle, an advanced emergency braking system (AEBS) that automatically brakes a vehicle to attenuate shock and avoid a collision with a forward vehicle, an adaptive cruise control (ACC) system that controls a vehicle to drive itself at a speed set by a driver, a lane departure warning system (LDWS) that gives a warning of lane departure, a lane keeping assist system (LKAS) that controls a vehicle not to depart from the current lane, a blind spot detection (BSD) system that senses objects in a blind spot out of the visual field of a driver, a rear-end collision warning (RCW) system that senses and gives a warning of an object behind a vehicle, a smart parking assist system (SPAS) that assists automatic parking etc.

In order to operate these driver assistance systems, there is a need for various sensors such as a camera, a front sensor, a rear sensor, a speed sensor, a gyro sensor, a steering sensor, and a GPS device. Driver assistance systems include a controller that controls the systems using information obtained from various sensors.

Controllers read information sensed by the sensors to operate the driver assistance systems in real time and generally use an interrupt method and a polling method to read the information from the sensors.

The interrupt method is a method that reads in real time information from sensors having an event, using a controller, in response to event signals from the sensors. The event means the case in which a controller needs to operate a system by receiving and processing information and generating a corresponding control signal.

The polling method is a method that periodically reads information from sensors regardless of whether the sensors have sensed an event.

The interrupt method and polling method each have advantages and disadvantages. The interrupt method has the advantage that because a controller reads information at any time, if necessary, the controller consumes a large amount of power due to large load, but it is possible to quickly obtain information and accordingly there are fewer errors in the output from a driver assistance system. On the other hand, according to the polling method, a controller consumes a small amount of power due to small load, but it can read information only when a polling period is reached, so it cannot quickly obtain information. Accordingly, the polling method has a disadvantage that real-time output from a driver assistance system is difficult, so there are large errors in dealing with situations.

Therefore, there is a need for a controller that can effectively control a driver assistance system by selectively combining the advantages of the interrupt method and the polling method.

SUMMARY OF THE INVENTION

The present disclosure has been made in an effort to solve the problems and an aspect of the present disclosure is to provide a driver assistance system having a controller that can effectively control the system by quickly obtaining information with small load, and a method of controlling the driver assistance system.

In this background, an aspect of the present disclosure is to provide a controller including a sub-controller that controls an external driving device by providing a control signal generated on the basis of information from at least one sensor, and determines a point to read information from the sensor in response to an event signal based on a predetermined condition provided from the sensor.

Another aspect of the present disclosure provides a driver assistance system including: at least one sensor; a driving device that is controlled on the basis of a sensing result by the sensor; and a controller that controls the driving device by providing a control signal generated on the basis of information from the sensor, and determines a point to read information from the sensor in response to an event signal based on a predetermined condition provided from the sensor.

Another aspect of the present disclosure provides a method of controlling a driver assistance system, the method including: receiving a signal from at least one sensor; determining whether information sensed by the sensor satisfies a predetermined condition in response to the signal; reading the information in real time when the information satisfies the condition, and waiting a predetermined period and then reading the information when the information does not satisfy the condition; and controlling an external driving device by providing a control signal generated by processing the information to the driving device.

According to the present disclosure, since the controller operates in a polling mode in a normal state, it is possible to reduce load on the controller and the power consumption by the controller. Further, since the controller operates in an interrupt mode when the sensors initially access the controller and when an even occurs, it is possible to quickly input information and output a control signal, so it is possible to quickly obtain information in real time and errors in output from the driver assistance system are accordingly reduced; therefore, it is possible to effectively control the driver assistance system.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
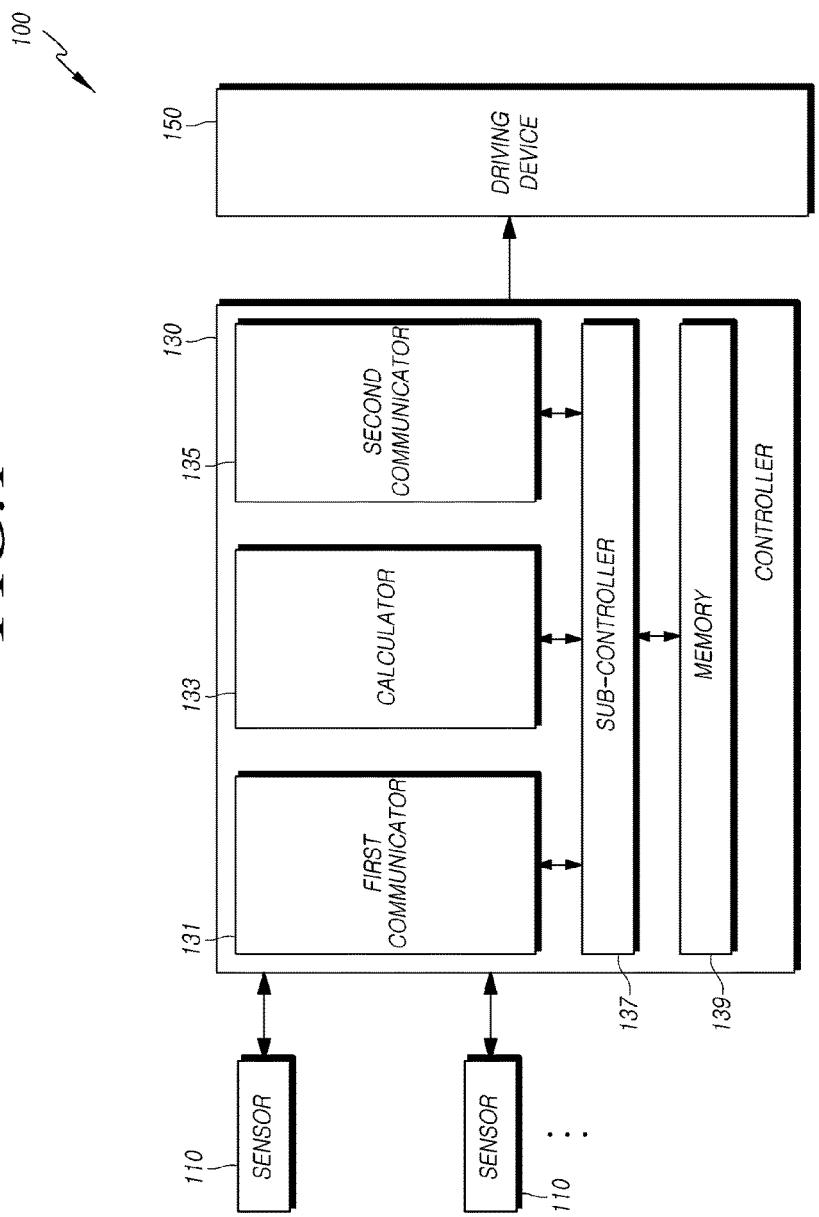
FIG. 1 is a view schematically showing the configuration of a driver assistance system according to an embodiment of the present disclosure.

Hereinafter, embodiments of the present disclosure will be described in detail with reference to the accompanying drawings. The following embodiments are provided, by way of example, so that the idea of the present disclosure can be sufficiently transferred to those skilled in the art. Therefore, the present disclosure is not limited to the embodiments as described below, and may be embodied in other forms. Also, in the drawings, the size, thickness, and the like of a device may be exaggeratedly represented for the convenience of description. Throughout the specification, the same reference numerals designate the same elements.

The advantages and features of the present disclosure and methods of achieving the same will be apparent by referring to embodiments of the present disclosure as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements. In the drawings, the dimensions and relative sizes of layers and regions may be exaggerated for the convenience of description.

When an element or layer is referred to as being "above" or "on" another element, it can be "directly above" or "directly on" the other element or layer or intervening elements or layers may be present. In contrast, when an element is referred to as being "directly on" or "directly above" another element or layer, there are no intervening elements or layers present.

Spatially relative terms, such as "below", "beneath", "lower", "above", "upper" and the like, may be used herein for ease of description to describe one element or feature's relationship to another element(s) or feature(s) as illustrated in the figures. It will be understood that the spatially relative terms are intended to encompass different orientations of the element in use or operation in addition to the orientation depicted in the figures. For example, if the element in the figures is turned over, elements described as "below" or "beneath" other elements would then be oriented "above" the other elements. Thus, the exemplary term "below" can encompass both an orientation of above and below.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s).

FIG. 1 is a view schematically showing the configuration of a driver assistance system according to an embodiment of the present disclosure.

A driver assistance system 100, which warns a driver of a danger to protect the driver and passengers, and automatically controls driving of a vehicle, may include a plurality of sensors 110, a controller 130 that generates control signals by processing information provided from the sensors 110, and a driving device 150 that is operated in response to control signals from the controller 130.

In general, the driver assistance system 100 can sense a danger of accident or can sense lanes, blind spots, and a rear area through visual, aural, and tactual elements, using the sensors 110 that are high-tech sensors. The driver assistance system 100 may be a forward collision warning (FCW) system, an advanced emergency braking system (AEBS), an adaptive cruise control (ACC) system, a lane departure warning system (LDWS), a lane keeping assist system (LKAS), a blind spot detection (BSD) system, a rear-end collision warning (RCW) system, or a smart parking assist system (SPAS).

The forward collision warning (FCW) system is a system that senses a forward vehicle running in the same direction in the current lane and gives a driver a visual, aural, or tactual warning to avoid a collision with a forward vehicle.

The advanced emergency braking system (AEBS) is a system that senses a possibility of collision with a forward vehicle in the current lane and gives a warning to a driver, and automatically brakes the subject vehicle to attenuate shock or avoid a collision when determining the driver has made no response or a collision is unavoidable.

The adaptive cruise control (ACC) system is a system that controls a vehicle to drive itself at a speed set by a driver, and when a forward vehicle running at the speed set by a driver or lower appears during self-driving, the system controls the subject vehicle to follow the forward vehicle in order not to interfere with traffic flow. Further, this system provides a function of automatically stopping the subject vehicle when finding a forward vehicle stopped at an intersection etc. during running, and of automatically starting the subject vehicle after the forward vehicle is started.

The driver assistance system 100 performs control on the basis of sensing results provided from the various sensors 110 and the various sensors 110 may include a camera, a front sensor, a rear sensor, a speed sensor, an acceleration sensor, a gyro sensor, a steering sensor, and a GPS module.

The camera takes pictures of the front, rear, and side areas of a vehicle, thereby sensing objects such as lanes and other vehicles. The front sensor and the rear sensor may be ultrasonic sensors or radars and are installed on the front and rear of a vehicle, respectively, whereby they can sense objects approaching the front and rear of the vehicle. The speed sensor and the acceleration sensor sense the speed and the acceleration of a vehicle, respectively, and the gyro sensor can sense inclination of a vehicle. The steering sensor senses a turn of a steering wheel and the GPS module allows for locating a vehicle using a GPS satellite.

The driving device 150, which is an actuator that is controlled on the basis of sensing information from the sensors 110, may include devices that can generate output to the outside in a vehicle such as a steering wheel, a brake system, and a navigation system, but is not limited thereto.

The controller 130 processes and provides information provided from the sensors 110 to the driving device 150 and may include a first communicator 131, a second communicator 135, a calculator 133, a sub-controller 137, and a memory 139.

The controller 130 reads information from the sensors 110 using both of a polling mode and an interrupt mode.

In the polling mode, the controller 130 reads information from the sensors 110 at each predetermined polling period, and different polling periods may be set in the sensors 110, depending of their characteristics. For example, when the polling period of the steering sensor is set to 0.1 seconds, the controller 130 reads information from the steering sensor at each 0.1 seconds, and when the polling period of the GPS module is set to 0.2 seconds, the controller 130 reads information from the GPS module at each 0.2 seconds.

In the interrupt mode, the controller 130 reads information every time an event occurs, and in this embodiment, when the sensors 110 initially access the controller 130 and an event such as an emergency occurs, the controller 130 reads information from corresponding sensors 110. That is, when the driver assistance system 100 is powered and operated and the sensors 110 access the controller 130, the controller 130 reads information from the sensors 110 and can set polling periods by matching the start points of the polling periods of the sensors 110 with the point when reading the information.

As an example of a method that determines whether it is the initial access, it is possible to determine that the sensors 110 initially access the controller 130 when the engine of a vehicle is started or switches of the sensors 110 are turned on. As another example of the method that determines whether it is the initial access, it is possible to determine that the sensors 110 access the controller 130 when predetermined initial activation conditions set in the sensors 110 (for example, when a vehicle speed is a predetermined critical speed or higher) are satisfied.

Meanwhile, when an event such as an emergency occurs, the mode is changed into the interrupt mode, in which when a sensor 110 senses the event and transmits an event signal to the controller 130, the controller 130 enters the interrupt mode and immediately reads information from the sensor 110. The controller 130 sets the point when it read the information from the sensor 110 in the interrupt mode as the start of a new polling period.

The event means information that is generated in an emergency, and it may be determined as an emergency when a change in braking pressure is 10% or more for a predetermined time, for example, while the controller 130 continuously reads information twice, that is, during a polling period, when a change in wheel speed is 10% or more, and when an angular change of a steering wheel is 10% or more. Further, it may also be determined as an emergency when recognizing forward obstacles at a predetermined distance through a camera or a radar and receiving information about a specific obstacle through vehicle-to-vehicle communication (V2V) or vehicle-to-infrastructure communication (V2I).

The components of the controller 130 are described hereafter.

The first communicator 131 is operated for transmission/reception of information among the controller 130 and the sensors 110, and the sensors 110 can transmit an initial access signal, an event signal, and an update signal to the controller 130 through the first communicator 131. The controller 130 receives initial access signals, event signals, and update signals from the sensors 110 through the first communicator 131 and can read information sensed by the sensors 110 through the first communicator 131.

The second communicator 135 transmits a control signal generated by the sub-controller 137 to the driving device 150 and can receive and transmit a feedback signal generated by the driving device 150 to the sub-controller 137.

The first communicator 131 and the second communicator 135 can transmit/receive information, using CAN (Controller Area Network) communication, MUX (Multiplex) communication, LAN communication, and LIN communication that are automotive communication protocols.

The calculator 133 can perform calculation using information read from the sensors 110 through the first communicator 131. For example, the calculator 133 can calculate where an obstacle exists in the forward area, using information sensed by a front sensor. Further, the calculator 133 can also calculate the positions of lanes from a picture taken by a camera. The values calculated by the calculator 133 can be transmitted to the sub-controller 137.

The sub-controller 137 controls the operations of the first communicator 131, the second communicator 135, and the calculator 133, and can generate a control signal for controlling the driving device 150 on the basis of the values calculated by the calculator 133. The control signal generated by the sub-controller 137 can be transmitted to the driving device 150 through the second communicator 135. Further, the driving device 150 can transmit information about the operation, which it has performed in response to a control signal from the controller 130, back to the controller 130, in which the sub-controller 137 may perform feedback by checking whether the driving device 150 operates as it should in response to the control signal.

The sub-controller 137 can control selection of a polling mode or an interrupt mode in accordance with a predetermined reference and can control transmission/reception of information with the sensors 110 by controlling the operation of the first communicator 131. The reference for the sub-controller 137 to select a polling mode or a interrupt mode may be whether it is the first access to the sensors 110 and whether an event has occurred. For example, when the driver assistance system 100 is powered and the sub-controller 137 initially accesses the sensors 110, an interrupt mode is started. The sub-controller 137 can read values sensed by the sensors 110 from the sensors 110 and can set start points of polling periods when it reads information from the sensors 110 with reference to the access times of the sensors 110 as start points. The polling periods of the sensors 110 may be set different, depending on the characteristics of the sensors 110 or the characteristics of information.

When receiving an event signal representing that an event has occurred from a sensor 110, the sub-controller 137 starts the interrupt mode to immediately read information sensed by the sensor 110 through the first communicator 131. The sub-controller 137 can provide the read information to the calculator 133 so that the information is calculated, and then can provide the information to the driving device 150 though the second communicator 135.

The sub-controller 137 starts an interrupt mode and reads information in real time from the sensors 110 only when the sensors 110 initially access the controller 130 and an event signal is received, and in other cases, it operates in a polling mode and periodically reads information from the sensors 110.

The memory 139 stores the time when the sub-controller 137 read information from the sensors 110 when it is operated in an interrupt mode, and accordingly, information about the start points of polling periods to be used in a polling mode can be stored.

The first communicator 131, calculator 133, second communicator 135, sub-controller 137, memory 139 etc. used in the controller 130 according to an embodiment of the present disclosure described above may be implemented as modules in an integrated control system or an ECU for a vehicle.

Such integrated control system or ECU for a vehicle may include a processor, a storage device such as a memory, and computer programs that can perform specific functions, and the first communicator 131, calculator 133, second communicator 135, sub-controller 137, memory 139 etc. may be implemented as software modules that can perform their own functions.

Figure 2:
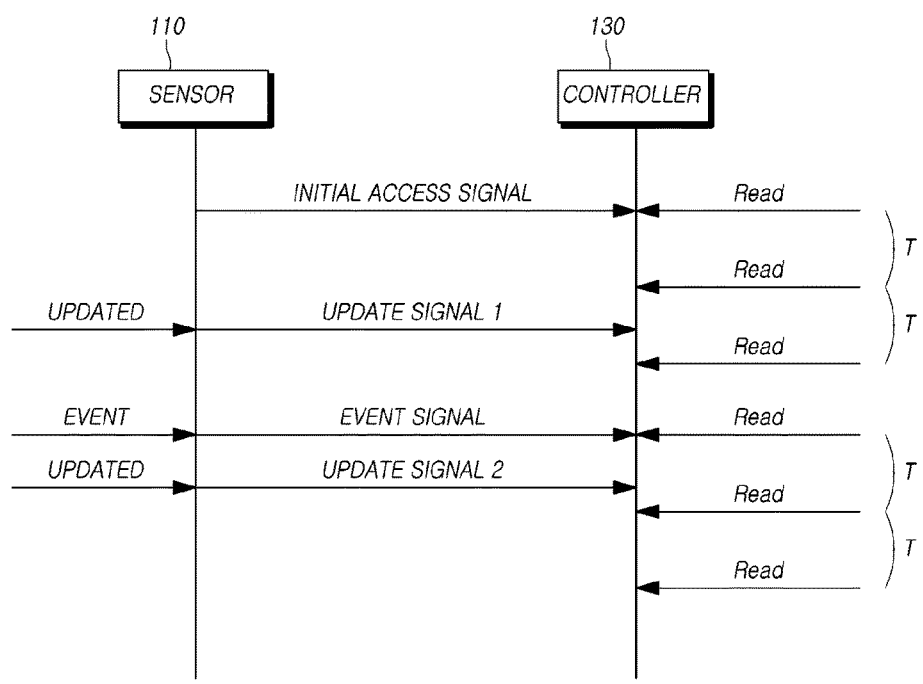
FIG. 2 is a conceptual view showing information transmission/reception between a sensor and a controller in the driver assistance system according to an embodiment of the present disclosure.
Figure 3:
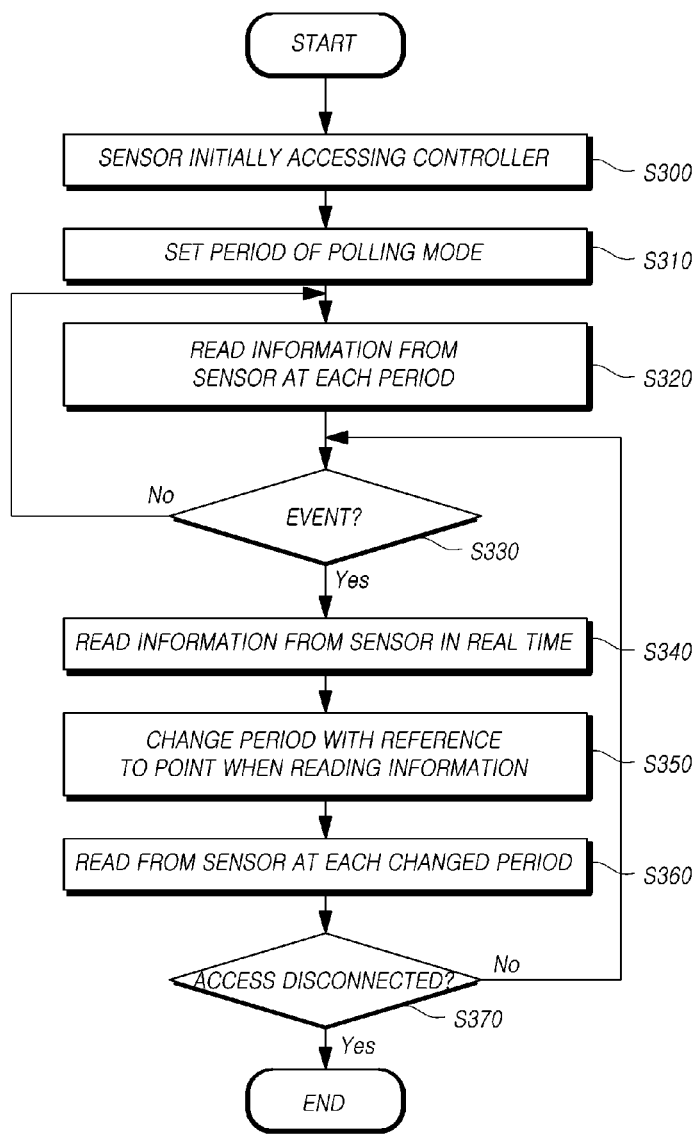
FIG. 3 is a flowchart showing a process of controlling the driver assistance system according to an embodiment of the present disclosure.

The process in which the controller 130 operates using both of an interrupt mode and a polling mode in the driver assistance system 100 having the configuration described above is described hereafter with reference to FIGS. 2 and 3.

When the driver assistance system 100 is powered and the sensors 110 initially access the controller 130, the sub-controller 137 reads information sensed by the sensors 110 in response to initial access signals input through the first communicator 131. The sub-controller 137 operates in an interrupt mode and can set the start points of polling periods to be used in a polling mode (S310). Accordingly, the sub-controller 137 can read information from the sensors 110 in accordance with the polling periods (S320). The lengths of the polling periods of the sensors 110 may be different.

The sub-controller 137 can provide the read information to the calculator 133 so that the information is calculated, and then can generate a control signal using the calculated values. The sub-controller 137 can transmit the control signal to the driving device 150 through the second communicator 135.

When new information is input from the sensors 110, that is, when information is updated while reading information from the sensors 110 in accordance with the polling periods, the sub-controller 137 reads the updated information at the next polling periods. That is, even if information is updated before a polling period, it is possible to read the information when the polling period is reached.

The sub-controller 137 monitors whether event signals are input from the sensors 110 (S330), and when an event signal is input, the sub-controller 137 can read information in real time from the corresponding sensor 110 having the event through the first communicator 131 (S340). That is, the sub-controller 137 is temporarily operated in an interrupt mode. When information is read in the interrupt mode, the information is provided to the calculator 133 to be processed, and the sub-controller 137 can generate a control signal on the basis of the processed value and transmit the control signal to the driving device 150 through the second communicator 135.

When operating in an interrupt mode in this way, the sub-controller 137 can set again the start points of polling periods from the point when it reads information from the sensors 110 in the interrupt mode (S350). That is, the poling periods that have been used in the polling mode before an interrupt mode are reset and the sub-controller 137 newly sets the start points of polling periods from the point when it reads information in the interrupt mode.

After newly setting polling periods, the sub-controller 137 operates in a polling mode in accordance with the new polling periods, and reads information from the sensors 110 at the polling periods (S360). The sub-controller 137 reads information from the sensors 110 using both of a polling mode and an interrupt mode by continuously checking event signal until access is disconnected.

As described above, in the controller 130 and the driver assistance system 100 having the controller 130 according to an embodiment of the present disclosure, the controller 130 reads information from the sensors 110 at predetermined polling periods in a polling mode in a normal state, but it operates temporarily in an interrupt mode and immediately reads information from the sensors 110 when the sensors 110 initially access the controller 130 and when an event occurs. Accordingly, since the controller 130 operates in a polling mode in a normal state, it is possible to reduce load on the controller 130 and the power consumption by the controller 130. Further, since the controller 130 operates in an interrupt mode when the sensors initially access the controller 130 and when an even occurs, it is possible to quickly input information and output a control signal, so it is possible to quickly obtain information in real time and errors in output from the driver assistance system 100 are accordingly reduced; therefore, it is possible to effectively control the driver assistance system 100.

The characteristics, structure, effects etc. described in the embodiments are included in at least one embodiment of the present disclosure and are not necessarily limited to only one embodiment. Further, characteristics, structure, effects etc. exemplified in the embodiments may be modified or combined with other embodiments by those skilled in the art. Accordingly, the configurations related to the combinations and modifications should be construed as being included in the scope of the present disclosure.

Further, although the present disclosure was described above with reference to the exemplary embodiments, the exemplary embodiments are only examples and do not limit the present disclosure, and those skilled in the art would know that the present disclosure may be changed and modified in various ways not exemplified above without departing from the scope of the present disclosure. For example, the components described in detail in the exemplary embodiments of the present disclosure may be modified. Further, differences relating to the changes and modifications should be construed as being included in the scope of the present disclosure which is determined by claims.

What is claimed is:

1. A controller comprising:
a sub-controller configured to control an external driving device by providing a control signal generated on the basis of information from at least one sensor, and to determine a point to read information from the sensor in response to an event signal based on a predetermined condition provided from the sensor,
wherein the sub-controller operates in one of an interrupt mode in which the sub-controller reads information from the sensor in real time and a polling mode in which the sub-controller periodically reads information from the sensor in accordance with a predetermined polling period.

2. The controller of claim 1, wherein the sub-controller operates in the interrupt mode when the event signal is input from the sensor.

3. The controller of claim 2, wherein the event signal is a signal that is generated in an emergency in which the driving device should be controlled in real time.

4. The controller of claim 1, wherein the sub-controller operates in the interrupt mode when an initial access signals is input from the sensor.

5. The controller of claim 1, wherein the sub-controller operates in the polling mode while the event signal is not input from the sensor.

6. The controller of claim 5, wherein the sub-controller changes a start point of the polling period with reference to a point when the sub-controller reads information from the sensor in real time in response to the input event signal.

7. A driver assistance system comprising:
at least one sensor;
a driving device configured to be controlled on the basis of a sensing result by the sensor; and
a controller configured to control the driving device by providing a control signal generated on the basis of information from the sensor, and to determine a point to read information from the sensor in response to an event signal based on a predetermined condition provided from the sensor,
wherein the controller operates in one of an interrupt mode in which the sub-controller reads information from the sensor in real time and a polling mode in which the sub-controller periodically reads information from the sensor in accordance with a predetermined polling period.

8. The system of claim 7, wherein the controller operates in the interrupt mode when the event signal is input from the sensor.

9. The system of claim 7, wherein the event signal is a signal that is generated in an emergency in which the driving device should be controlled in real time.

10. The system of claim 7, wherein the controller operates in the interrupt mode when an initial event signal is input from the sensor.

11. The system of claim 7, wherein the controller operates in the polling mode while the event signal is not input from the sensor.

12. The system of claim 11, wherein the controller changes a start point of the polling period with reference to a point when the controller reads information from the sensor in real time in response to the input event signal.

13. A method of controlling a driver assistance system, the method comprising:
receiving a signal from at least one sensor;
determining whether information sensed by the sensor satisfies a predetermined condition in response to the signal;
reading the information in real time when the information satisfies the condition, and waiting a predetermined period and then reading the information when the information does not satisfy the condition; and
controlling an external driving device by providing a control signal generated by processing the information to the driving device.

14. The method of claim 13, wherein the determining includes determining whether an event signal that is generated in an emergency, in which the driving device should be controlled in real time, is input from the sensor, and
the reading of information includes reading information from the sensor in real time when the event signal is input.

15. The method of claim 13, wherein the determining includes determining whether an initial access signal is input from the sensor, and
the reading of information includes reading information from the sensor in real time when the initial access signal is input.

16. The method of claim 13, wherein further comprising changing a point when information is read into a start point of the period, when the information is read in real time from the sensor in the reading of information.

* * * * *